United States Patent [19]

Gabrielli et al.

[11] Patent Number: 4,538,263
[45] Date of Patent: Aug. 27, 1985

[54] VARIABLE-BAND SWITCHING SYSTEM FOR VOICE AND DATA COMMUNICATION

[75] Inventors: Luciano Gabrielli, Leini; Maurizio Sposini, Rivalta di Torino, both of Italy

[73] Assignee: Cselt Centro Studi e Laboratori Telecommunicazioni SpA, Turin, Italy

[21] Appl. No.: 502,084

[22] Filed: Jun. 8, 1983

[30] Foreign Application Priority Data

Jun. 9, 1982 [IT] Italy .............................. 67736 A/82

[51] Int. Cl.³ .............................................. H04J 3/00
[52] U.S. Cl. ......................................... 370/86; 370/94
[58] Field of Search ........................ 370/86, 85, 94, 60

[56] References Cited

U.S. PATENT DOCUMENTS

| | | | |
|---|---|---|---|
| 3,681,759 | 8/1972 | Hill | 370/86 |
| 3,786,418 | 1/1974 | Nick | 370/86 |
| 3,855,422 | 12/1974 | Cadiou et al. | 370/86 |
| 3,904,829 | 9/1975 | Martin et al. | 370/86 |
| 4,210,780 | 7/1980 | Hopkins et al. | 370/86 |
| 4,225,752 | 9/1980 | Looschen | 370/86 |
| 4,320,500 | 3/1982 | Barberis et al. | 370/60 |

OTHER PUBLICATIONS

"Coming of Age: A Long-Awaited Standard for Heterogeneous Nets" Harold C. Folts, *Data Communications*, Jan. 1981, pp. 63–73.
"Data Processing-Open Systems Interconnection-Basic Reference Model", *Computer Networks*, 1981, pp. 81–118, North-Holland Publishing Company.
"A Local Access Network for Packetized Digital Voice Communication" Don H. Johnson et al., 13.4.1–13.4.5.
"Software Error Checking Procedures for Data Communication Protocols", J. Wong et al., *Computer Design*, Feb.1979, pp. 122–125.

*Primary Examiner*—Douglas W. Olms
*Assistant Examiner*—Frank M. Scutch, III
*Attorney, Agent, or Firm*—Karl F. Ross; Herbert Dubno

[57] ABSTRACT

A communication system serving a number of nodes, each associated with a group of subscriber terminals, comprises a unidirectional bus bent into a loop to form a transmitting branch and a receiving branch respectively connected by an outgoing coupler and an incoming coupler to all the terminals of a given node. In each node a plurality of detectors on opposite sides of the outgoing coupler monitor the activity of the transmitting branch to determine whether the bus is free from any signal carrier originating at an upstream node, or generated at the node considered, and is thus available for voice or data packets to be sent out. Each terminal includes a receiving unit, responsive to a pre-engagement packet addressed thereto via the incoming coupler, which starts a local time base to establish a succession of frames encompassing each a number of time slots allocated to active speech channels in a voice period of a frame; the remainder of each frame is available for data transmission. The number of time slots constituting the voice period is variable; a memory forming part of a control section including the time base stores information on the state of activity of each time slot.

9 Claims, 10 Drawing Figures

VARIABLE-BAND SWITCHING SYSTEM FOR VOICE AND DATA COMMUNICATION

CROSS-REFERENCE TO RELATED APPLICATION

This application contains subject matter disclosed in our copending application Ser. No. 476,224 filed Mar. 17, 1983.

FIELD OF THE INVENTION

Our present invention relates to a system for the digital transmission, via a wide-band bus which could be a fiber-optical signal path, of information originating at various sources, e.g. telephone sets, data terminals and video or facsimile stations.

BACKGROUND OF THE INVENTION

In our above-identified copending application we have disclosed and claimed a system of this general type using a bus common to a multiplicity of terminals or stations operating in a broadcast mode, each station being able to pick up all the messages transmitted over the bus but actually extracting only those that are specifically addressed to it. An interface at each station comprises a first or lower-tier portion (DLC) with wired-logic circuitry and a second or higher-tier portion (VPP) with microprogrammed circuitry. The first portion (DLC) temporarily stores outgoing information to be sent over the bus as well as incoming information received from the bus and addressed to the station involved, this information being in the form of digital message frames. The second portion (VPP), under the control of a microprocessor, organizes the establishment of virtual point-to-point links between the station referred to and other stations.

As further described in our copending application, whose disclosure we wish to incorporate by reference into the present one, the second interface portion (VPP) may concurrently handle several virtual links extending between its own station and respective other stations reached through the bus. These links are being handled independently of one another as concerns their initialization, termination and possible re-initialization. One or more packets with different ultimate destinations may be encompassed in a single outgoing message frame. Several frames, especially short ones, may be successively sent out in a single binary sequence after access to the bus has been obtained. Stations competing for such access may avail themselves, according to the teachings of our copending application, of a contention protocol of the type known as CSMA-CD (for Carrier-Sense Multiple-Access Collision Detection) with presistent probability. Such a protocol has been described, for speech-signal transmission, in a paper titled "A Local Access Network for Packetized Digital Voice Communication" by Daniel H. Johnson and Gerald C. O'Leary, presented at the 1979 IEEE National Telecommunication Conference held Nov. 27-28, 1979 in Washington, D.C. Reference may also be made to an article titled "A Carrier Sense Multiple Access Protocol for Local Networks" by Simon S. Lam, published on pages 21–32 in Vol. 4 of COMPUTER NETWORKS (1980), and to a further article titled "Performance Analysis of Carrier Sense Multiple Access with Collision Detection" on pages 245–259 of the same publication.

In another commonly owned copending application, Ser. No. 425,858 filed Sept. 28, 1982 by one of us (Maurizio Sposini) jointly with three others, there has been disclosed a generally similar communication system in which the CSMA-CD contention protocol is used for both speech and data transmission by stations competing for access to the bus. A station having obtained access is allotted a time slot of suitable length in a recurrent frame to be utilized for sending out speech packets. The part of each frame not used for voice communication is available for data transmission. The duration of a frame corresponds to the recurrence time of consecutive packets relating to one and the same voice communication; thus, the allocation of homologous periods of successive frames establishes a synchronous channel for such communication. Such synchronism, on the other hand, is not required for data transmission. In a specific instance given in that pending application, a frame has a duration of 20 ms sufficient to accommodate a considerable number of 1000-bit speech packets at a transmission rate of 30 Mbits/sec, with time left over for data transmission in a residual period.

As further described in application Ser. No. 425,858, whose disclosure we also wish to incorporate by reference into the present one, the emission of an actual speech packet is preceded by a "booking" or pre-engagement packet of like duration designed to reserve a time slot in an available frame position for the establishment of a speech-communication channel. A state-of-line memory unit stores a "map" reflecting the activity of the bus in each frame, i.e. the distribution of pre-engagement, speech and data packets therein, thus providing information on frame time available for new bookings.

OBJECTS OF THE INVENTION

The general object of our present invention is to provide means for adapting the technique of our copending application Ser. No. 476,224 to a system for voice and data communication serving a number of groups of relatively closely spaced terminals, such as a public integrated-service network with high terminal concentrations or "islands" (e.g. buildings) scattered over a wide area.

A more particular object of our invention is to provide means for establishing synchronous speech-communication channels in such a system without the need for a centralized control station.

SUMMARY OF THE INVENTION

We realize these objects, in accordance with our present invention, by providing a unidirectional bus of the aforementioned wide-band type bent back upon itself to form a loop with a transmitting branch and a receiving branch, the two branches traversing a multiplicity of spaced-apart nodes each associated with a plurality of subscriber terminals. All the terminals of a given node are respectively connected to the transmitting and the receiving branch by a common outgoing coupler and a common incoming coupler. Each node is further provided with activity-detecting means, including a detector connected to the transmitting branch upstream of the outgoing coupler, for determining whether the bus is free from a signal carrier originating at a node more remote from the bent end of the bus, said collision-detecting means connected to the transmitting branch downstream of the outgoing coupler for blocking access requests from associated terminals in the presence of signals transmitted by another terminal of the same group. Each terminal is divided into a lower level portion, dialoguing with the bus through the associated couplers, and a higher-level portion making and breaking connections between individual subscriber sets and the lower-level portion in establishing and terminating virtual point-to-point links with other terminals. The lower-level portion includes logic circuitry, responsive to an arriving pre-engagement packet addressed to the terminal being considered, for starting a local time base to establish a succession of frames encompassing variable voice and data periods, the voice period including a time slot commensurate with the received pre-engagement packet to mark the beginning of a synchronous speech channel which remains in effect until the arrival of a release packet. The voice period is then available for the transmission of outgoing speech packets from the same terminal while the remainder of the frames can be used for data transmission as well as for the emission of new pre-engagement packets. The lower-level portion also includes memory means for storing the state of the line in each case, i.e. the presence or absence of packets on the bus in the voice and data periods.

With a nonspecific pre-engagement packet, designed to be picked up by all terminals along the bus, each terminal (including the one emitting that packet) will start its own clock so that these clocks will operate quasi-simultaneously, i.e. with a relative offset from the originating terminal corresponding to the transit time around the loop from that terminal and the respective receiving terminals. If the clocks of the various terminals are sufficiently accurate to maintain that quasi-synchronism for the maximum access time allotted to any terminal, no inter-terminal synchronization will be required. If necessary, however, such synchronism after start-up can be insured by a periodic pulse signal from a common oscillator coupled to the line.

BRIEF DESCRIPTION OF THE DRAWING

The above and other features of our invention will now be described in detail with reference to the accompanying drawing in which.

SPECIFIC DESCRIPTION

Figure 1:
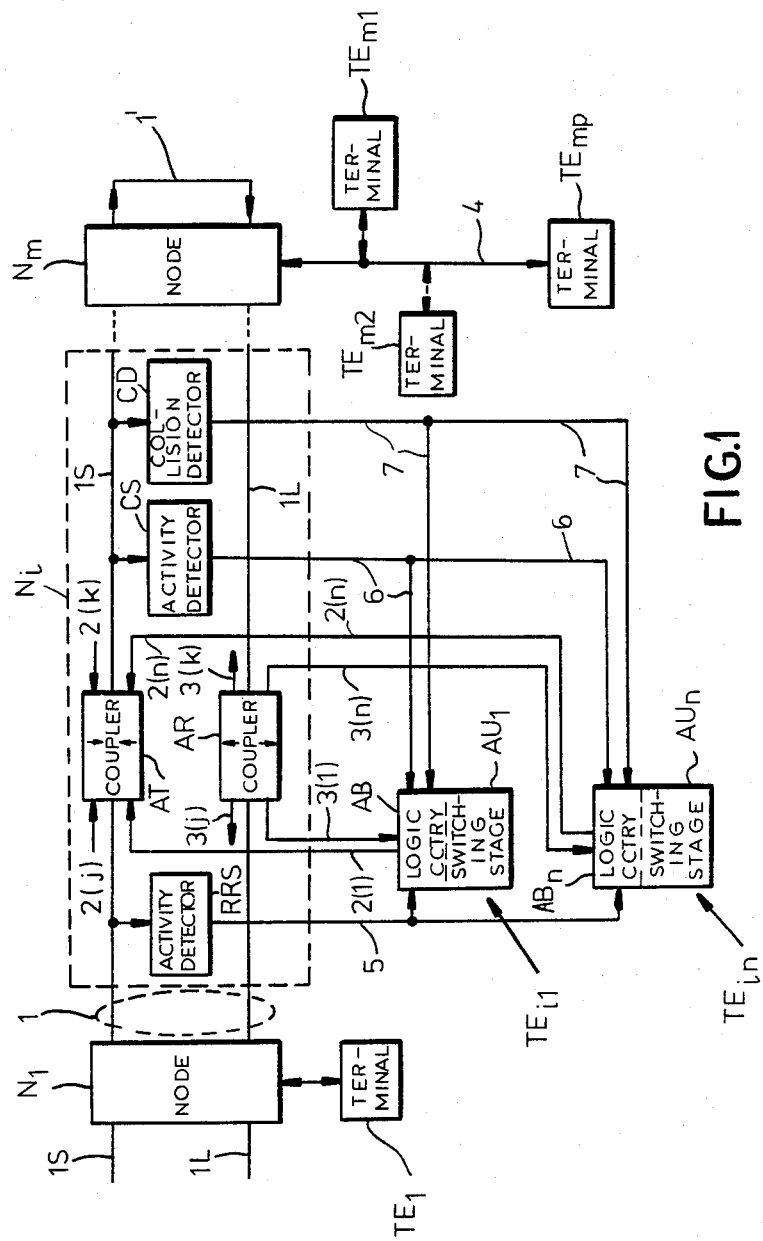
FIG. 1 is a block diagram of a representative part of a communication system embodying our invention, including a multiplicity of nodes each serving a group of associated terminals.

In FIG. 1 we have shown a unidirectional bus 1 which is bent back upon itself at a bight 1' to form a loop with a transmitting branch 1S and a receiving branch 1L. Spaced along this bus are a multiplicity of nodes $N_1 \ldots, N_i \ldots, N_m$ each serving one or more associated terminals designated $TE_1$ in the case of node $N_1$, $TE_{i1}$-$TE_{in}$ in the case of node $N_i$ and $TE_{m1}$, $TE_{m2}$, $TE_{mp}$ in the case of node $N_m$. The terminals associated with node $N_i$ are spaced at distances of the same order of magnitude (e.g. several hundred meters) from that node so as to form a cluster. Terminals $TE_{m1}$-$TE_{mp}$, on the other hand, are spaced along a bidirectional branch bus 4 connected to node $N_m$.

As particularly illustrated for node $N_i$, all the terminals of the associated group can communicate with the bus 1 via an outgoing coupler AT, inserted in transmitting branch 1S, and an incoming coupler AR, inserted in its receiving branch 1L. These couplers are connected to the associated terminals via respective line multiples 2 and 3. Multiple 2 includes leads 2(l) and 2(n) extending from terminals $TE_{i1}$ and $TE_{in}$, respectively, as well as other leads 2(j) and 2(k) originating at intermediate terminals of that group; multiple 3, similarly, includes leads 3(l) and 3(n) extending to terminals $TE_{i1}$ and $TE_{in}$, respectively, as well as leads 3(j) and 3(k) extending to nonillustrated terminals of the same group.

Node $N_i$ which of course is also representative of the other nodes, further includes a first activity detector RRS, connected to branch 1S at a point upstream of coupler AT, and a second activity detector CS, connected to that branch at a point downstream of coupler AT. A collision detector CD is also tied to branch 1S downstream of the same coupler. Detectors RRS, CS and CD have outgoing leads combined into respective line multiples 5, 6 and 7, extending to all the associated terminals.

Detector RRS senses the presence of a signal carrier on branch 1S coming from any of the upstream nodes, i.e. a node such as $N_1$ more remote than node $N_i$ from the bight 1' of the bus. Detector CS also senses these carriers as well as any carrier injected into the bus by coupler AT. Such detectors, as is well known in the art, may respond to changes in signal amplitude, indicating the beginning and the end of a carrier, or to the mean signal level on the bus. Detector CD may be a threshold circuit, designed to ascertain the coincidence of signals from two local terminals on the basis of an increase in power level; another possibility is the sensing of arhythmic signaling due to the overlap of different pulse trains.

Each terminal, as particularly indicated for the ones designated $TE_{i1}$ and $TE_{in}$, is subdivided into a lower-tier portion $AB_1 \ldots AB_n$ and an upper-tier portion $AU_1 \ldots AU_n$. The first portion comprises logic circuitry generally similar to that of the lower-tier interface portion (DLC) of our copending application Ser. No. 476,224 while the second portion is essentially a switching stage performing the tasks of the higher-tier interface portion (VPP) as well as of the upper levels of the hierarchic protocol described there, including the relaying of calls to and from the subscriber sets served by the terminal (which may be considered included in that portion thereof), the coding of outgoing messages as packets and the decoding of packets forming part of incoming messages. This latter portion, accordingly, also generates the addresses of called subscribers to set up virtual point-to-point links, emits acknowledgment signals to a terminal of a calling subscriber for the completion of such a link, and dialogues with the corresponding portion of the remote terminal in releasing a connection.

The several leads 2–7 enable each terminal associated with a given node to sense the activity of upstream terminals on both branches, 1S, 1L while detecting the activity of downstream terminals only on branch 1L. This asymmetry enables the various nodes to operate in a "round robin" arrangement which lets any terminal communicate with any other. An interval sufficient to let each terminal access the bus at least once, for a time long enough to enable the emission of stored outgoing packets, may be termed a "round". The time of access provided for a given terminal in the course of such a round is independent of the instants at which these outgoing packets have been generated. Thus, the duration of a round will vary in accordance with the number of terminals having packets to transmit and the number of packets to be sent out. A limit, which may differ among the several terminals, may be imposed upon the number of packets that can be sent out in any round. In setting such a limit, which could be changed in the course of operations, the round-trip delay will also have to be taken into account. The beginning of a new round is marked by a logic network (GP) of any terminal, described hereinafter with reference to FIGS. 2 and 4, upon the absence of any activity on the bus for a predetermined period corresponding to the transit time from the last downstream node $N_m$ to the node associated with the terminal in question.

Detectors CS and CD could be combined into a single unit.

When terminals associated with different nodes quasi-simultaneously compete for access, priority is automatically given to the transmission originating at the node farthest upstream, i.e. the one most remote from bight 1'. The term "quasi-simultaneous" is here to be understood as meaning the concurrent presence of signals at a given location along the trunk, e.g. the time of passage of a packet from node $N_i$ through the junction of the bus with activity detector RRS coinciding with an access request from, say, terminal $TE_{i1}$.

The use of two activity detectors RRS and CS on opposite sides of outgoing coupler AT facilitates a distinction between signals emitted at an upstream node and those emitted at the node $N_i$ here considered. A terminal associated with node $N_i$ can transmit only when neither detector RRS nor detector CD has an output. An incipient transmission must be stopped in response to a signal from detector RRS and will be resumed when that signal disappears to indicate that the line is again idle. In order to avoid loss of information in the event of an aborted transmission, a preamble without message content and of suitable duration is to be generated at the beginning of each activity period of a given terminal.

Once a synchronous channel has been established, there will be no interference with the emission of speech packets in the corresponding time slots of consecutive frames. However, the emission of data packets (which in this instance also includes a pre-engagement packet generated prior to the establishment of a frame sequence) will be subject within node $N_i$ to the absence of collision as evidenced by the lack of an output of detector CD. When collision is found to exist, access will be granted according to the aforementioned CSMA-CD protocol.

Thus, our system affords random access for the transmission of data packets or other asynchronous messages, including an initial pre-engagement packet, and strictly synchronous access for the actual speech packets, all without resort to a centralized control station.

Since the virtual point-to-point link set up for voice communication between two terminals must generally allow for two-way transmission, a voice period initiated by an arriving pre-engagement packet should also accommodate outgoing speech packets. The start of a frame sequence in response to the arrival of a pre-engagement packet from a remote terminal will therefore enable the local terminal to send back an acknowledgment packet in an adjoining time slot to act as a pre-engagement RP packet at the remote terminal, received in the voice period of the frame sequence thereof.

The logic circuitry of each terminal further includes memory means designed to store a "map" of line activity in any frame, generally as described in commonly owned application Ser. No. 425,858 but with specific reference to the time slots of the voice period assigned to active channels. The map will therefore provide information on the busy or idle state of each channel, the beginning of the voice period and the number of active channels contained in that period. This information is extracted from the receiving branch 1L during one frame and is used in the immediately following frame for controlling packet transmission on branch 1S.

As long as a frame sequence can accommodate additional channels, the allocation of further time slots to the exchange of speech packets in response to new pre-engagement packets causes no problem. The deactivation of existing channels, however, may create gaps within the voice period which ought to be filled by new bookings, if any, to avoid unnecessary expansion of this period. Only when all the gaps have been filled, and if space is still available, may further time slots be assigned outside the group already active.

Figure 2:
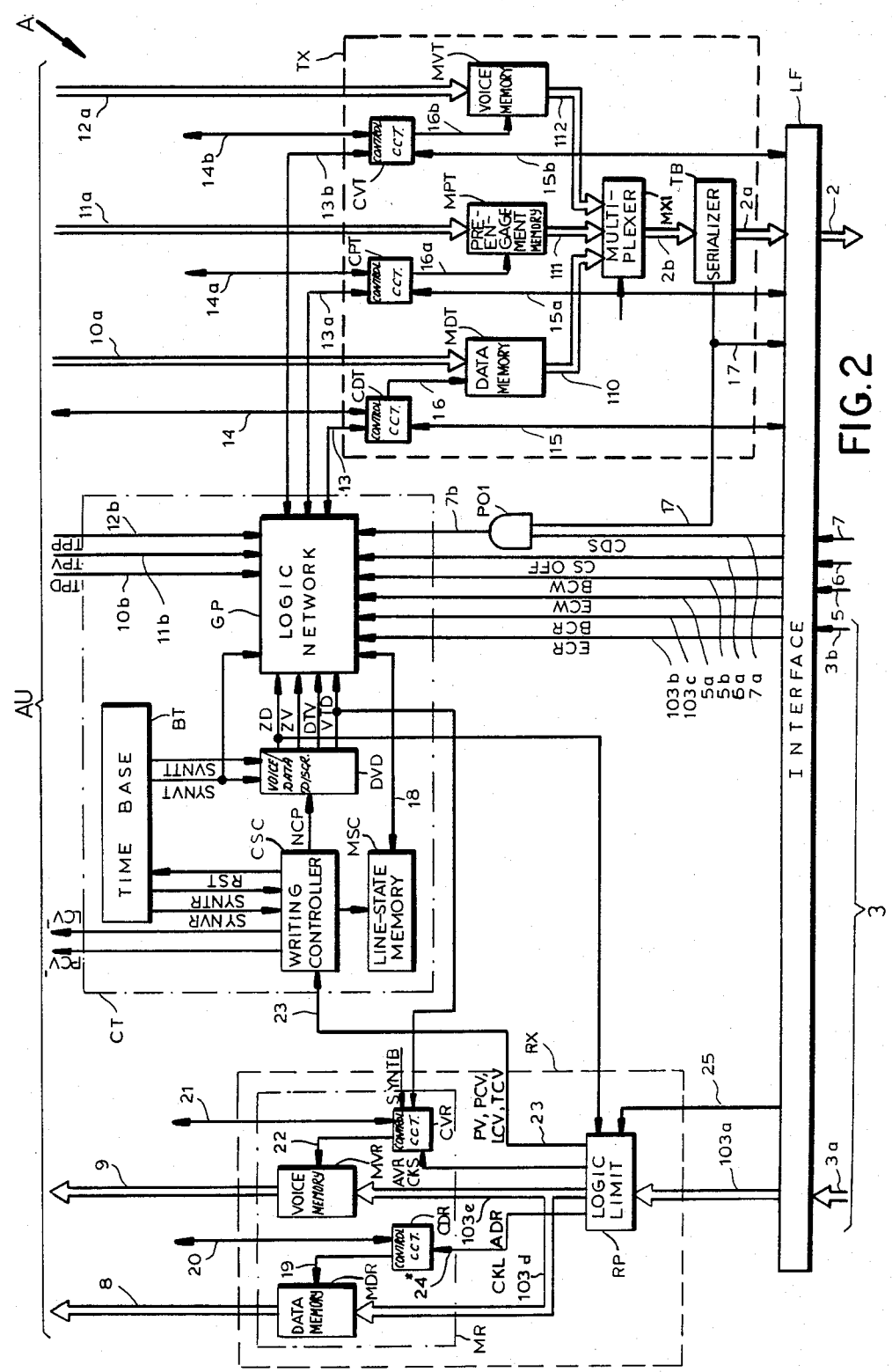
FIG. 2 is a diagram showing details of a lower-tier portion of one of the terminals of FIG. 1.

Reference will now be made to FIG. 2 showing details of the logic circuitry of a generic lower-tier portion of a terminal. This circuitry includes a receiving section RX, a transmitting section TX and a timing and control section CT. In conformity with the showing adopted in our copending application Ser. No. 476,224, incorporated by reference into the present case, one-line arrows are used to denote signal leads whereas double-line arrows represent message lines carrying incoming or outgoing packets. Also shown in FIG. 2 is an interface LF which communicates with couplers AT, AR and detectors RRS, CS and CD of FIG. 1 via connections 2–7, connection 3 being seen to include a message line 3a and a signal line 3b. Packets incoming on line 3a are forwarded to a logic unit RP of receiving section RX via an extension 103a of that line, this logic unit also receiving loading commands from the interface on a lead 25.

Logic unit RP may be similar to a unit (DA) shown in FIG. 10 of application Ser. No. 476,224, including a shift register loaded bit by bit with the words of an incoming packet, an address comparator, several registers and a control circuit serving to inform the higher-tier interface portion (VPP) of the correct and complete extraction of a packet. The address comparator, however, is replaced in unit RP by a decoder generating various signals PV, PCV, LCV and IZV on a connection 23 extending to a writing controller CSC in timing section CT. Thus, signal PV identifies an incoming speech packet, signal PCV characterizes an arriving pre-engagement packet, signal LCV designates a channel-release packet and signal IZV accompanies the first incoming speech packet in a voice period.

A storage unit MR includes a random-access data memory MDR and a random-access voice memory MVR receiving respective packets from logic unit RP via lines 103d and 103e. Memories MDR and MVR further receive, via leads 19 and 22, writing and reading commands from respective control circuits CDR and CVR having inputs tied to signal lines 24* and 24. Two-way connections 20 and 21 extend from control circuits CDR and CVR to the associated switching stage AU, as do message lines 8 and 9 respectively originating at the two memories. Control circuit CDR may be generally similar to a controller (CBR) shown in FIG. 12 of our copending application. Controller CVR will be described in greater detail hereinafter with reference to FIG. 3.

Voice memory MVR preferably is divided into two identical halves which are alternately read and written in each frame, in response to a frame-synchronization signal SYNTR emitted by a time base BT in section CT and delivered controller CVR as well as to writing controller CSC forming part of that section. The latter further includes a line-state memory MSC, generally similar to a memory so designated in pending application Ser. No. 425,858, a voice/data discriminator DVD, and a logic network GP communicating with transmitting section TX. The transmitting section contains three random-access memories, namely a voice memory MVT, a pre-engagement memory MPT and a data memory MDT, associated with respective control circuits CVT, CPT and CDT. Data, pre-engagement and speech packets are respectively loaded into memories MDT, MPT and MVT via message lines 10a, 11a and 12a originating at switching stage AU and are selectively read out, via lines 110, 111, 112 and a multiplexer MX1, to a line multiple 2b delivering their bits in parallel to a serializer TB. The serializer has parallel outputs connected to another line multiple 2a extended by interface LF to multiple 2. The serialized bits are fed on a lead 17 to the same interface as well as to one output of an AND gate P01 whose other input receives a collision signal CDS from connection 7 via interface LF and an extension lead 7a; an output lead 7b of that gate goes to network GP.

Control circuits CDT, CPT and CVT communicate with network GP via respective leads 13, 13a, 13b, with switching stage AU via respective leads 14, 14a, 14b, with interface LF via respective leads 15, 15a, 15b, and with the corresponding memories via respective leads 16, 16a, 16b. The signals from logic network GP enabling controllers CDT, CPT and CVT to command the readout of their memories also set the multiplexer MX1 to its proper position.

Figure 4:
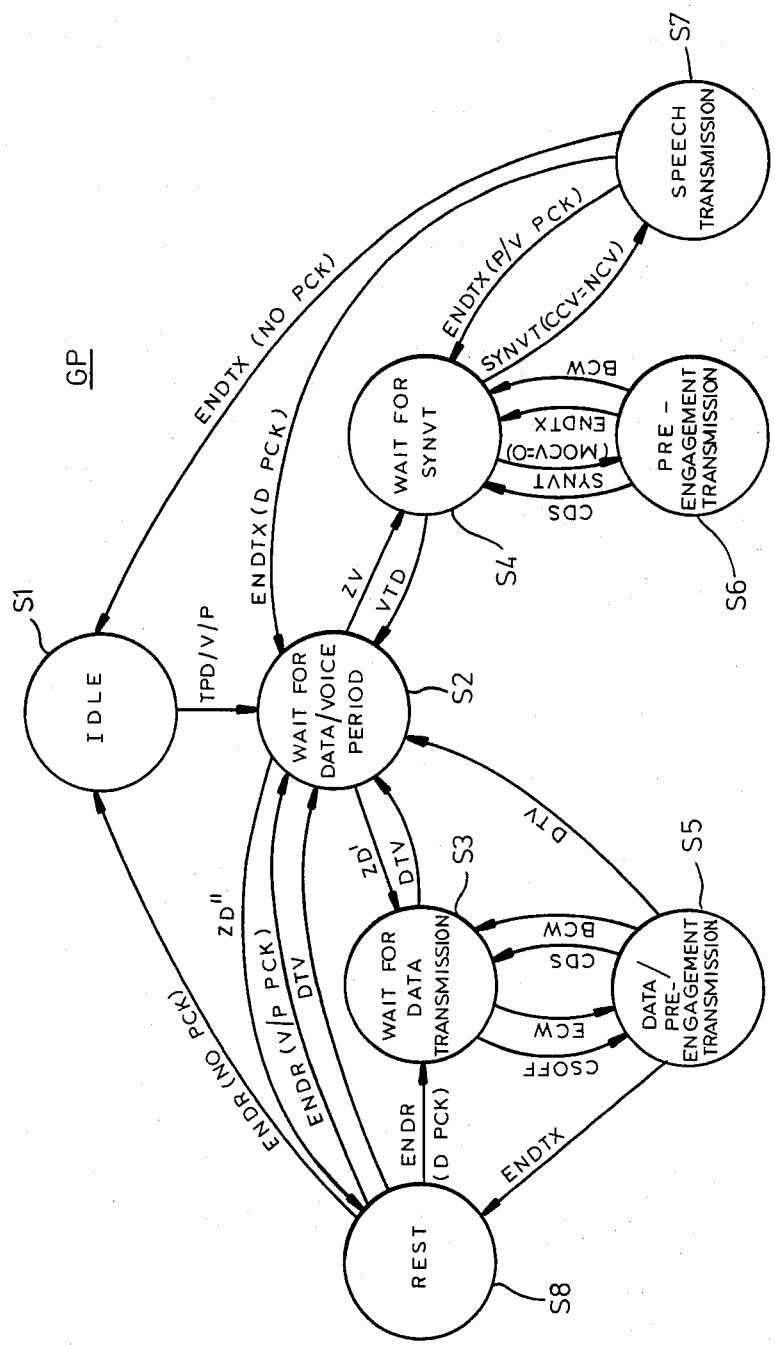
FIG. 4 is a flow chart relating to the operation of a logic network included in the circuitry of FIG. 2.

Controllers CDT and CPT may each be generally similar to a controller (CBT) shown in FIG. 4 of copending application Ser. No. 476,224. Controller CVT can also have such a structure.

Time base BT, upon being started by a signal RST from writing controller CSC, also generates a speech-channel-synchronization signal SYNVR fed to controller CSC, a corresponding signal SYNVT fed to discriminator DVD and to logic network GP, and a further frame-synchronizing signal SYNTT also fed to that discriminator.

Logic network GP receives from switching stage AU commands TPD, TPV and TPP for the readout of data packets, speech packets and pre-engagement packets, respectively, these commands appearing on leads 10b, 11b and 12b. The activity of the bus, as determined by coupler AR and detectors RRS, CS and CD (FIG. 1), are reported to network GP via interface IF in the form of a beginning-of-carrier signal BCR on a lead 103c and an end-of-carrier signal ECR on a lead 103b, a signal BCW on a lead 5b and a signal ECW on a lead 5a respectively denoting the beginning and the end of a writing phase, a signal CSOFF on a lead 6a indicating the absence of an output signal from detector CS, and the collision signal CDS on lead 7a already referred to.

The aforementioned line 24, originating at logic unit RP, carries a timing or clock signal CKR (corresponding to a signal BYTCON shown in FIGS. 11 and 13 of our copending application) and an enabling signal AVR; analogous signals CKL (corresponding to a signal LEGBYT shown in FIG. 13 of the copending application) and ADR are sent by unit RP to controller CDR on line 24*.

Discriminator DVD, on the basis of signals SYNVT and SYNTT from time base BT, generates signals ZD and ZV during a data period and a voice period of a frame, a signal DTV at the instant of transistion from data to voice, and a signal VTD at the instant of reverse transition. These four signals are fed to network GP, signal VTD being also supplied to controller CVR.

Writing controller CSC, upon receiving from logic unit RP the signal IZV indicating the beginning of a voice period, generates the frame-starting signal RST which activates the time base BT. On the basis of signals PV, PCT and LCV received from unit RP, along with signals SYNVR and SYNTR arriving from time base BT, the controller loads respective cells of memory MSC with information regarding the beginning of a voice period, the number of channels in that period and the busy or idle state of each channel, i.e. whether or not a speech or pre-engagement packet arrived in the corresponding time slot. This information is used for the filling of gaps in the voice period, as will become subsequently apparent. Controller CSC further supplies the switching stage AU with signals PCV' and LCV' respectively indicating the booking and the release of any incoming speech channel.

The line-monitoring memory MSC, dialoguing with network GP via a two-way connection 18, advantageously also consists of two identical halves that are alternately read and written in each frame. Thus, as in the case of memory MVR, information written in one half during one frame is read out during the loading of the other half in the immediately succeeding frame.

The descriminating signal ZD is also fed to logic unit RP to enable the generation of signal IZV at the end of the first data period.

The synchronization signals SYNTR and SYNVR, relating to received frames and their voice periods, will be offset with reference to the corresponding synchronization signals SYNTT and SYNVT, relating to transmitted frames and voice periods, in accordance with the loop delay encountered between couplers AT and AR (FIG. 1). This delay, predetermined for any given node, is preset in time base BT. Controller CSC also feeds a channel count NCP to unit DVD.

The structure of components GP, CSC and DVD will become apparent from the programs described hereinafter with reference to FIGS. 4–7.

Figure 3:
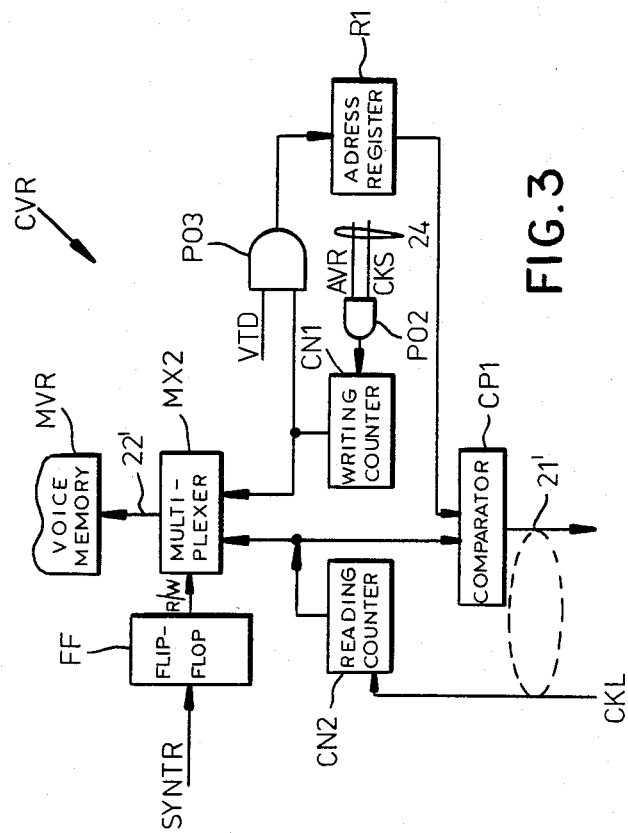
FIG. 3 is a more detailed diagram of a control circuit illustrated in FIG. 2.

As shown in FIG. 3 for one of the two halves of voice memory MVR, controller CVR comprises a writing-address counter CN1 and a reading-address counter CN2 alternately connectable to that memory half via a multiplexer MX2 whose output lead 22' is part of the line 22 shown in FIG. 2. Multiplexer MX2 alternately connects lead 22' to one or the other counter under the control of a read/write signal R/W from a flip-flop FF which is switched by the frame-synchyronization pulse SYNTR. Writing-address counter CN1 is advanced, through the intermediary of an AND gate PO2, upon the coincidence of a clock pulse CKS with enabling signal AVR, both generated by logic unit RP (FIG. 2) on respective leads of connection 24; clock pulse CKS is generated in any time slot of a voice period while enabling signal AVR is emitted only when a time slot is occupied by a speech packet. At the end of a voice period, i.e. upon transition to a data period, signal VTD from discriminator DVD (FIG. 2) unblocks an AND gate PO3 through which the last count of counter CN1 is delivered to an address register R1. Reading-address counter CN2 is stepped by clock pulses CKL from switching stage AU (FIG. 2) and delivers its addresses not only to one of the inputs of multiplexer MX2 but also to an input of a comparator CP1 whose other input receives the address stored in register R1. The output lead of comparator CP1 and the stepping lead of counter CN2 are a conductor pair 21' forming part of the two-way line 21 shown in FIG. 2. Comparator CP1 signals to switching stage AU an identity of the addresses reached by counter CN2 and stored in register R1 to stop the emission of clock pulses CKL when all the speech packets loaded into the corresponding half of memory MVR have been read out. The components shown in FIG. 3 are, of course, duplicated for the other half of that memory, with relatively inverted switching of the two address counters by the associated multiplexer.

Reference will now be made to FIG. 4 showing the program executed by logic network GP. From an initial idle state S1 the network moves to a state S2 in response to any of the signals TPD, TPV, TPP emitted by switching stage AU (cf. FIG. 2). The network now awaits a signal from discriminator DVD indicating the existence of a voice period or a data period. The data-period signal ZD referred to in the description of FIG. 2 actually takes one of two forms ZD' and ZD". Signal ZD' is generated when no data packets have yet been transmitted in the current round; signal ZD" occurs after such a transmission has taken place. In the presence of signal ZD', network GP progresses to a state S3 awaiting a time suitable for sending out a data packet in a state S5. Such a time occurs when the bus is found idle during the existing data period, as marked by the end-of-writing signal ECW on lead 5a and the simultaneous presence of signal CSOFF on lead 6a indicating the absence of collision. Since the data period also prevails when no frame has yet come into existence, state S5 is used to command the readout of a data packet from memory MDT or of a first pre-engagement packet from memory MPT, with priority given to pre-engagement packets.

When all the packets stored in memory MDT and/or memory MPT have been read out, as reported to network GP by the associated controllers in the form of an end-of-transmission signal ENDTX, a state of rest S8 is reached. This state S8 is also attained directly from state S2 in the presence of signal ZD". If, however, a busy line or a collision is indicated by the appearance of a signal BCW or CDS, the unit returns to the waiting state S3. If the data period ends before all packets are sent out, as indicated by the appearance of a signal DTV prior to signal ENDTX, the earlier state S2 is regained. The state of rest S8 is also terminated by signal DTV, with a return to state S2, as well as by a signal ENDR representing the end of a round. The latter signal is generated by network GP in response to a certain interruption of carrier transmission along the bus, i.e. upon the elapse of a predetermined time interval between signals ECR and BCR on leads 103b and 103c. If no further packets (NO PCK) are to be transmitted at that time, network GP resumes its idle state S1. If, however, speech or pre-engagement packets are ready (V/P PCK), as indicated by a command TPD or TPP, the network returns to waiting state S2.

The transmission of speech packets is initiated in the presence of signal ZV from discriminator DVD, causing a change to a state S4 which awaits a channel-synchronism signal SYNVT from time base BT. If the voice period terminates prematurely as indicated by a signal VTD, state S2 is re-entered. If signal SYNVT appears in the current voice period, and the command which established the state S2 was a signal TPP, a change in state can occur only when an unoccupied time slot is encountered (MOCV=0); this leads to a state S6, causing the readout of a pre-engagement packet from memory MPT. From there the network returns to state S4 in the presence of end-of-transmission signal ENDTX, beginning-of-writing signal BCW or collision signal CDS.

If, on the other hand, a speech packet signaled by a command TPV is destined for an allocated channel of an established frame sequence, the network changes from state S4 to a state S7 when the corresponding time slot is encountered (CCV=NCV) with the appearance of signal SYNVT. The speech packet is now read out from memory MVT whereupon the end-of-transmission signal ENDTX is again generated. If no further packets are waiting (NO PCK), network GP returns to the idle state S1. If only data packets are available for transmission (D PCK), waiting state S2 is regained. If further pre-engagement or speech packets are to be sent out (P/V PCK), the network re-enters state S4.

Figure 5:
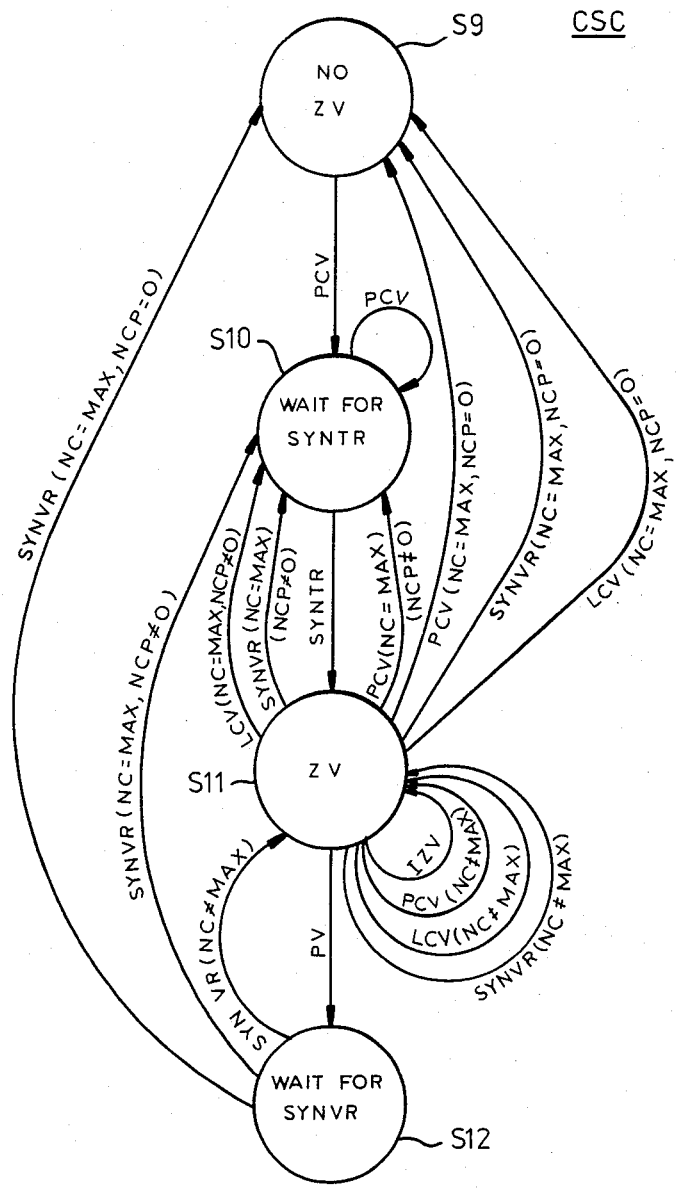
FIG. 5 is a similar flow chart relating to the operation of a writing controller shown in FIG. 2.

FIG. 5, to be considered jointly with FIGS. 6a–6d, represents the mode of operation of writing controller CSC. As long as no frame sequence has been established, and thus no voice period comes into existence, controller CSC is in a state S9, also indicated by a step 601 in FIG. 6a. Upon the arrival of a signal PCV indicating an incoming pre-engagement packet (step 602 in FIG. 6a) the controller registers the beginning of a voice period (FZV=1) in a step 603 and, after starting the time base BT by a signal RST in step 604, sends the corresponding signal PCV' in a step 605 to switching stage AU. All this occurs in a state S10 (FIG. 5) which the controller maintains as long as signals PCV are received. The controller further stores, in a step 606, the order number of the cell (SICV=1) assigned to the first busy speech channel, holds the adjoining channel available for further bookings (NCP=2) in a step 607, registers the order number of this busy channel as the first one, as counted from the beginning of the voice period in a step 608 (NC=1) and as counted from the first busy channel in a step 609 (NC* =1), and further notes in a step 610 that no channel has been released in an earlier part of the voice period (A=0). The busy channel assigned to the cell address SICV, identified in a step 611 (FIG. 6b) by the corresponding writing address CCV of memory MSC (CCV=SICV), is entered in that memory by a step 612 [MOCV(SICV)=1].

Figure 6A:
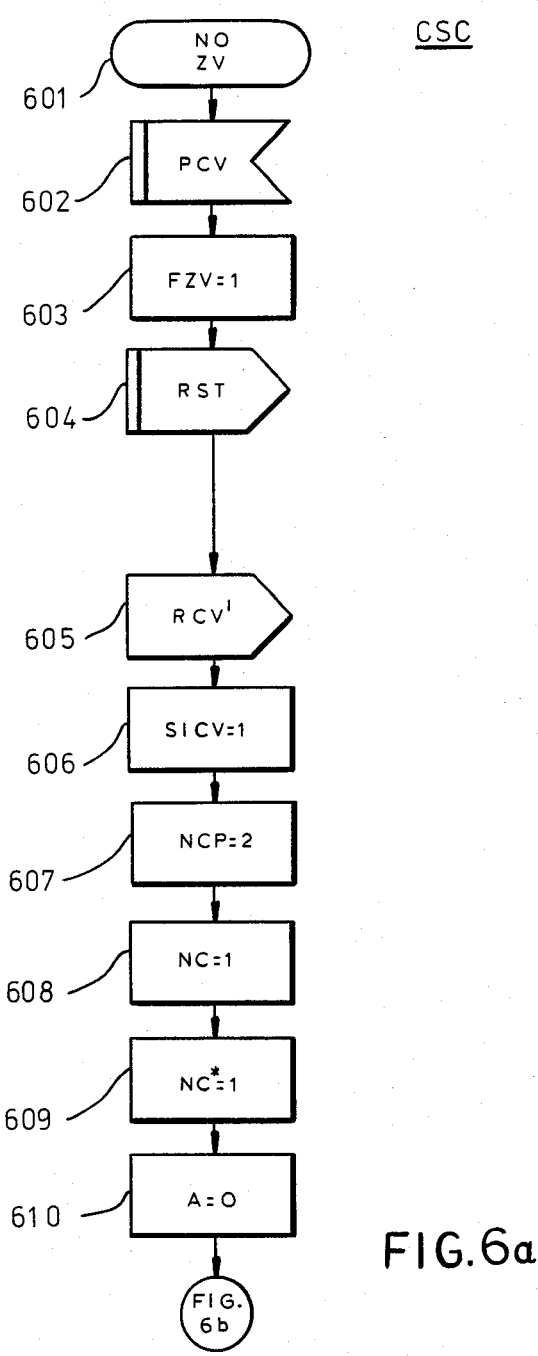
FIGS. 6a–6d are flow diagrams also pertaining to the operation of that controller.
Figure 6B:
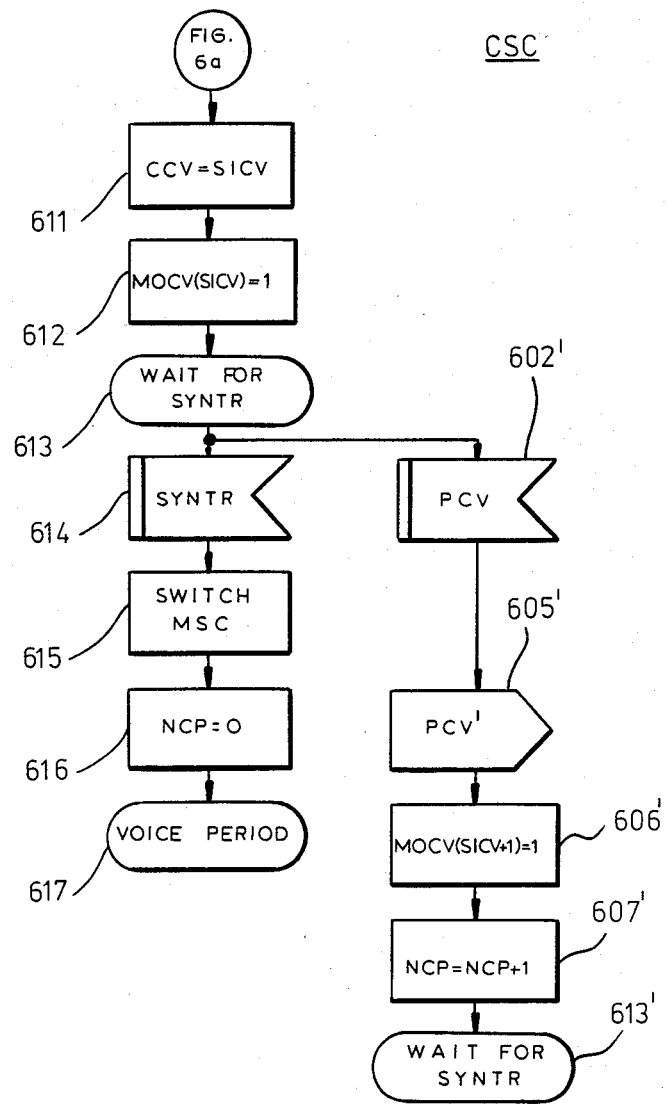

A step 613 in FIG. 6b represents the waiting for signal SYNTR in state S10. If the arrival of that signal is preceded by another signal PCV, as indicated at a step 602', controller CSC again sends out a signal PCV' in a step 605', enters in a step 606' a busy state [MOCV-(SICV+1)=1] in the corresponding cell of memory MSC, updates the number of channels in a step 607'

(NCP=NCP+1), and then again awaits the signal SYNTR in a step 613' while sending the count NCP to discriminator DVD.

With the arrival of signal SYNTR, in a step 614, the controller assumes a state S11 at the beginning of a voice period during which signal ZV is generated by discriminator DVD. This transition is marked in a step 615 by a switchover between the two halves of memory MSC, with presetting—in a step 616—of the previously read half to an initial writing address (NCP=0); the establishment of the voice period is represented by a step 617 in FIG. 6b.

Figure 6C:
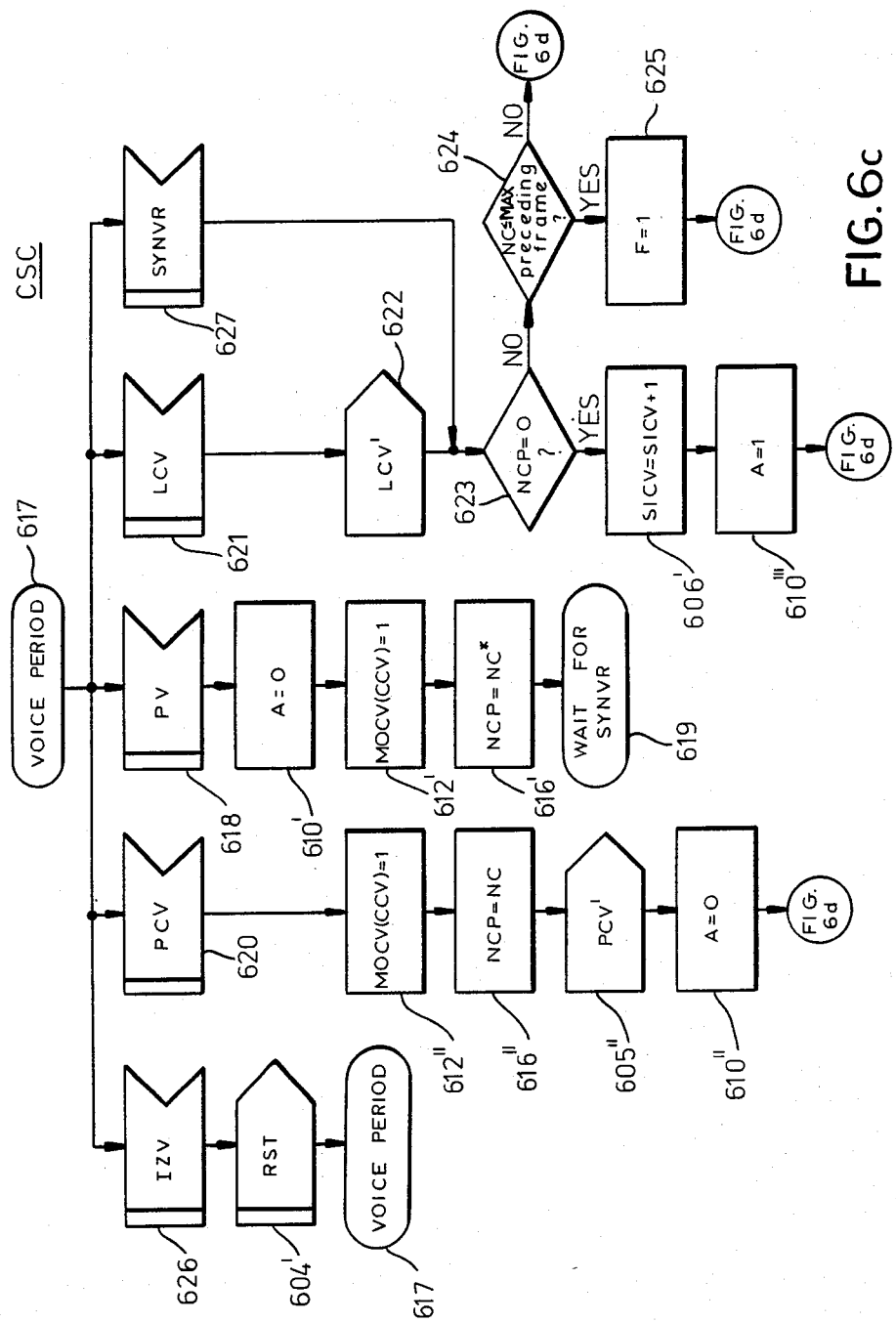

As indicated in FIG. 6c, five different subroutines can be initiated according to the signal next received. The arrival of a speech packet marked by a signal PV, step 618, causes a transition to a state S12 in which the controller awaits the arrival of a channel-synchronism signal SYNVR. This is followed by several updating steps 610' (A=0), 612' [MOCV(CCV)=1], and 616' (NCP=NC*) with actual establishment of state S12 in a step 619. The arrival of signal SYNVR causes a return to state S11 if the order number of the channel is different from the last one available in the voice period (NC≠MAX). If, however, this is the last channel (NC=MAX) and no further channels are booked (NCP=0), the initial state S9 is re-entered.

Upon the arrival of a new pre-engagement packet indicated by a signal PCV, step 620, the controller takes two more updating steps 612" [MOCV(CCV)=1] and 616" (NCP−NC), emits a signal PCV' in a step 605" and takes a further updating step 610" (A=0).

If a signal LCV indicating the arrival of a release packet occures in state S11, as symbolized by a step 621 in FIG. 6c, the controller emits signal LCV' in a step 622 and then inquires at a step 623 (NCP=0?) whether the number of channels in the voice period equals zero. If it does, i.e. if the current channel is the first one in a voice period, an updating step 606' (SICV=SICV+1) ensues, followed by another updating step 610''' (A=1). If the channel number NCP is greater than zero, another inquiry in a step 624 (NC≦MAX preceding frame?) determines whether the number of channels of the current frame is within the previous maximum. If so, the presence of a free channel (F=1) is noted in a step 625. Otherwise, the controller proceeds to an inquiry in a step 628 (FIG. 6d), as it does after the aforedescribed steps 610", 610''' and 625.

If, in state S11, the signal IZV indicating the beginning of a voice period is the one first encountered in a step 626, the controller emits the start signal RST in a step 604' to re-establish the voice period with a return to step 617. The arrival of signal SYNVR in step 627 directly leads to inquiry 623; this indicates that a precedingly occupied time slot has been vacated.

As will be apparent from FIG. 5, state S11 is maintained under the several circumstances last described unless one of the following conditions is satisfied: a coincidence of NC=MAX and NCP=0 with signal PCV, LCV or SYNVR restores the initial state S9; with NCP≠0, the aforementioned coincidences will re-establish the state S10.

Figure 6D:
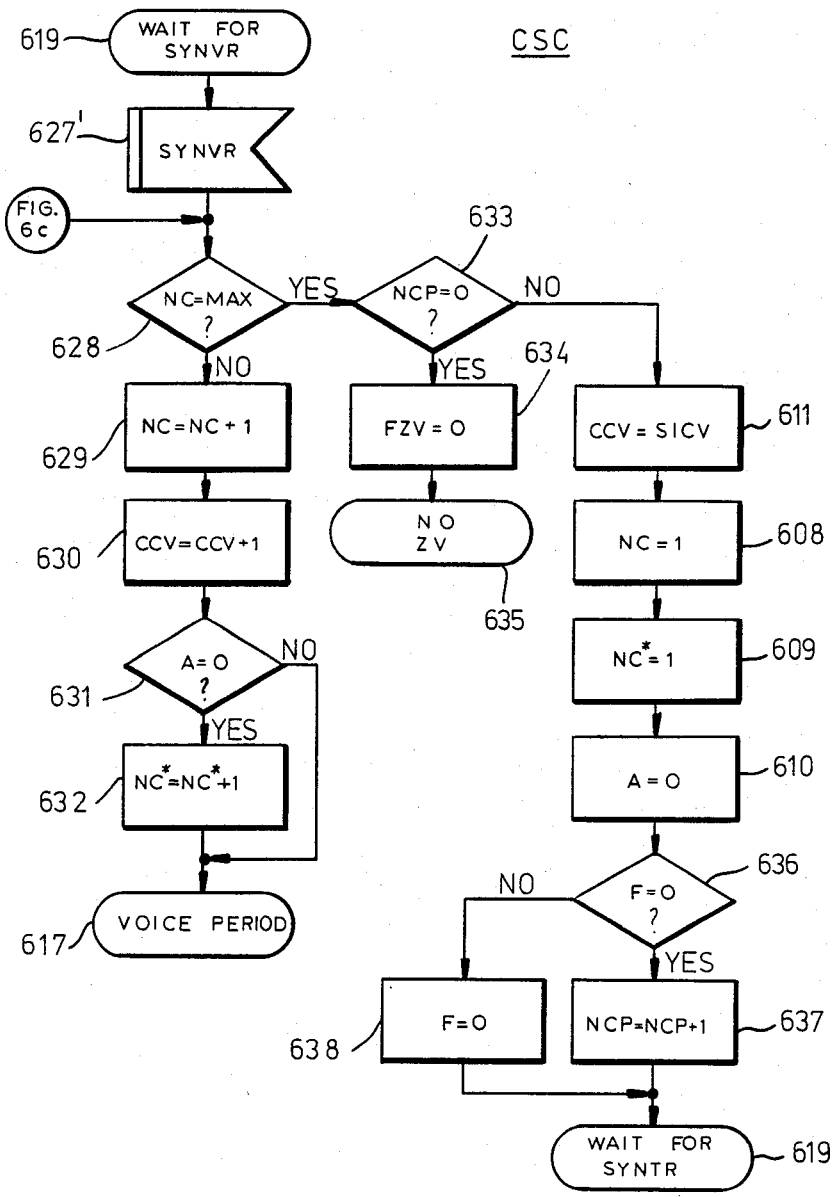

From step 619, shown in FIG. 6d, the controller also goes to an inquiry 628 upon the arrival of signal SYNVR in a step 627'. The inquiry (CN=MAX?) in step 628 leads, when the answer is negative, to further updating steps 629 (NC=NC+1) and 630 (CCV=CCV+1), another inquiry 631 (A=0?), and another updating step 632 (NC*=NC*+1) prior to a return to voice period 617 in the case of an affirmative answer. Step 632 is skipped if the answer is NO.

When inquiry 628 is answered in the affirmative, another inquiry 633 (NCP=0?) signals the end of the voice period (FZV=0) in a step 634 to re-establish state S9 in a step 635. If, however, the answer is negative, i.e. if the current voice period contains one or more busy channels, the frame will be formed to begin with address SICV+1 and the controller will take a series of steps 611, 608, 609, 610 as already described, followed by an inquiry 636 (F=0?) to determine if there is a free channel as established in step 625 (FIG. 6c). If not, i.e. if F=0, the number of channels in the voice period is incremented (NCP=NCP+1) in step 637 before a return to state S10 in step 619. If the answer to inquiry 636 is NO, the controller sets F=0 in step 638 before taking step 619.

Figure 7:
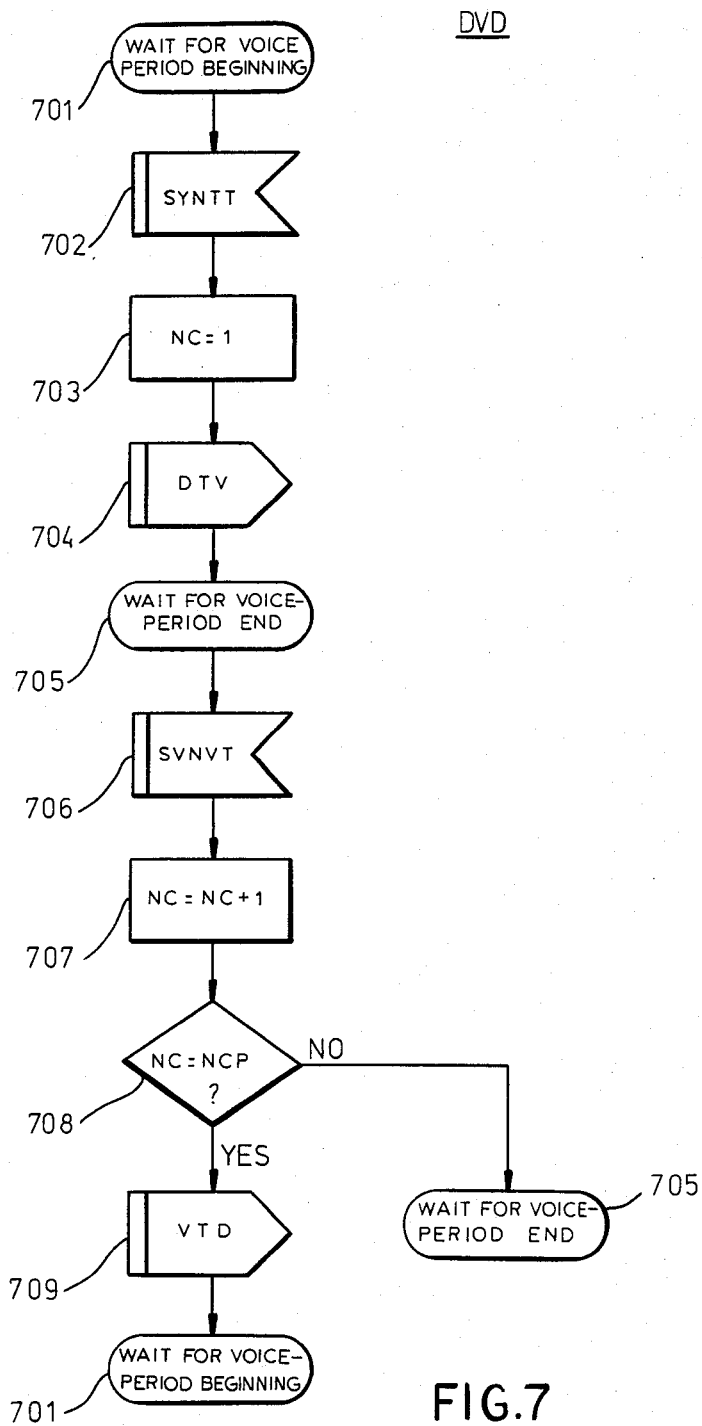
FIG. 7 is a flow diagram relating to the operation of a voice/data discriminator likewise shown in FIG. 2.

As shown in FIG. 7, discriminator DVD proceeds from a waiting step 701 in response to synchronizing signal SYNTT, step 702, to set the channel count NC=1 in a step 703; this is followed by the emission of signal DTV, step 704, whereupon the discriminator awaits in a step 705 the end of the voice period. Upon the arrival of signal SYNVT in a step 706, the order number of the speech channel is updated in a step 707 (NC=NC+1) and is compared in an inquiry 708 (NC=NCP?) with the total number of channels NCP fed in from controller CSC. If the answer is NO, the discriminator returns to the waiting step 705; it it is YES, the voice-to-data transition signal VTD is emitted in a step 709 whereupon the waiting step 701 recurs.

We claim:
1. A communication system wherein a plurality of nodes are associated with respective groups of subscriber terminals adapted for the exchange of speech and data packets via a common unidirectional bus forming a loop with a transmitting branch and a receiving branch passing through all said nodes, each node comprising an outgoing coupler and an incoming coupler linking all the terminals of the associated group with said transmitting branch and said receiving branch, respectively;

first and second detecting means in each node respectively disposed upstream and downstream of said outgoing coupler in said transmitting branch for recognizing the presence of signal carriers on said transmitting branch originating at any node upstream of a given node and at the given node itself and logic circuitry at each terminal comprising a receiving section coupled to said incoming coupler, a transmitting section coupled to said outgoing coupler and control section coupled to said first detecting means, said second detecting means, said incoming coupler, said receiving section and said transmitting section, each terminal further comprising means connected to said transmitting section, for generating and storing speech packets, data packets and pre-engagement packets and for informing said transmitting section of the availability of such packets to be sent out, and means coupled to said receiving section for storing received speech packets, data packets and pre-engagement packets, said control section being responsive to signals from said first and second detecting means for enabling said transmitting section to send out a waiting packet in the absence of conflicting activity on said bus, said receiving section being responsive to the arrival of a pre-engagement packet addressed thereto for starting a time base in said control section to initiate a series of frames with a duration at least equal to the recurrence period of consecutively generated speech packets certaining to a particular voice communication between two terminals, said time base subdividing each frame into a voice period for the emission of at least one speech packet in an allocated time slot and a residual period reserved for the emission of data packets, said series of frames terminating in the absence of further packets to be sent out whereupon another terminal of the same node or of a node further downstream along said transmitting branch can send out packets in the course of a round giving all terminals successive access to said transmitting branch.

2. A system as defined in cliam 1 wherein said receiving section is provided with a first data memory and a first voice memory for the temporary storage of incoming data and speech packets, said transmitting section is provided with a second data memory, a second voice memory and a pre-engagement memory for the temporary storage of corresponding outgoing packets, and said control section is provided with a further memory for storing information on the state of activity of any time slot allocated in a voice period to a speech channel assigned to a given voice communication in the series of frames established by said time base.

3. A system as defined in claim 2 wherein each of said memories is divided into two halves for alternate reading and writing.

4. A system as defined in claim 2 wherein said control section further includes logic means for commanding the readout of the memories of said transmitting section in response to signals from said time base.

5. A system as defined in claim 4 wherein said control section further includes discriminating means responsive to signals from said time base and from said receiving section for indicating to said logic means the beginning and the end of a frame and of a voice period thereof.

6. A system as defined in claim 4 wherein said logic means is programmed to reserve in each voice period a time slot adjoining one allocated to an outgoing speech packet for a response from the terminal to which said outgoing speech packet is addressed.

7. A system as defined in claim 2 wherein said control section includes writing-control means connected to said further memory for updating the contents thereof in response to signals from said time base and said receiving section.

8. A system as defined in claim 7 wherein said writing-control means is programmed to monitor the release of a time slot in a sequence of such time slots occurring during a voice period and to allocate a time slot so vacated to any speech channel newly initiated during generation of said series of frames.

9. A system as defined in claim 1 wherein said second detecting means comprises an activity detector and a collision detector.

* * * * *